UNITED STATES PATENT OFFICE.

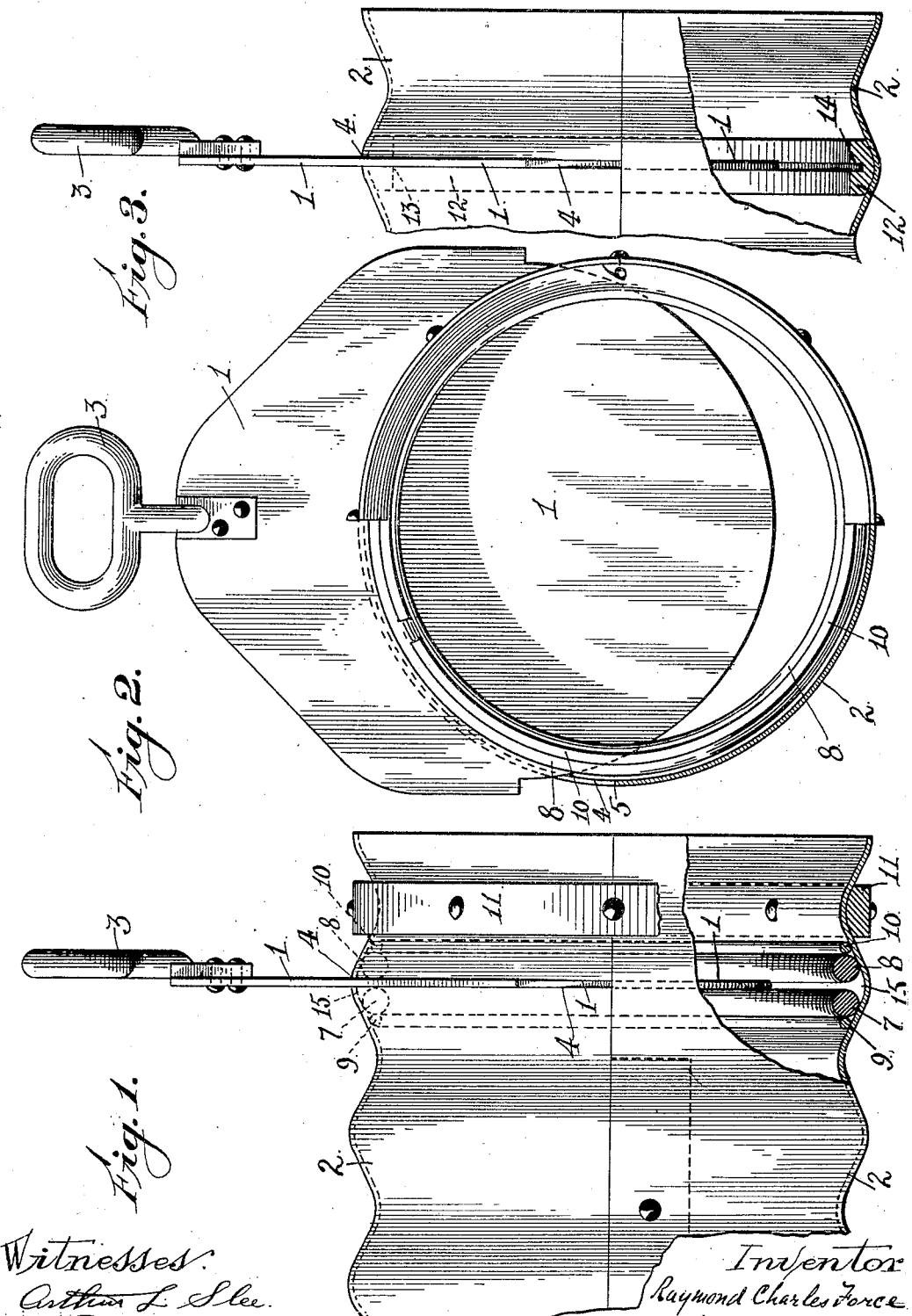

RAYMOND CHARLES FORCE, OF LOS ANGELES, CALIFORNIA, ASSIGNOR TO CALIFORNIA CORRUGATED CULVERT COMPANY, OF OAKLAND, CALIFORNIA, A CORPORATION OF CALIFORNIA.

SLIDE-GATE.

1,054,103.  Specification of Letters Patent.  Patented Feb. 25, 1913.

Application filed March 2, 1912. Serial No. 681,213.

*To all whom it may concern:*

Be it known that I, RAYMOND CHARLES FORCE, a citizen of the United States, residing at Los Angeles, in the county of Los Angeles and State of California, have invented certain new and useful Improvements in Slide-Gates, of which the following is a specification.

My invention relates to the class of slide-gates, and is adapted for use in connection with any fluid pipe, and especially with pipes used in irrigation systems.

The main object of my invention is to provide a gate which will be cheap, simple and durable and not liable to get out of order; one which will effectually guard against leakage and will close freely under all conditions.

To this end my invention consists in the novel gate which I shall hereinafter fully describe by reference to the accompanying drawings, in which—

Figure 1 is a side view and part section of my gate as attached to a corrugated metal pipe. Fig. 2 is an end view of the same partly in section. Fig. 3 is a side view, partly in section, showing a modification of the gate seat.

For convenience the gate is shown in partly opened position.

The slide 1 which forms the gate is provided with a lifting device of any suitable nature, here shown as a handle 3. The pipe 2 is provided with a cross-slot 4 with an opening just sufficient to receive the slide 1. This slot extends from the point 5 to the point 6, shown in Fig. 2; or, in other words, the length of the slot is equal to the half of the circumference of the pipe 2.

In shape the pipe may have any convenient form in cross section, such as square, oval or polygonal. The slide 1 is shaped so as to fit the lower half of the pipe; that is, if the pipe is circular, as here shown, the lower part of the slide is made a semi-circle, as shown in Fig. 2.

The seat for the slide may be constructed in various ways having in view the provision of a tight bearing surface between the pipe and slide. For example, in Fig. 3 I show a reinforcing ring 12 fitted to the interior of the pipe, said ring having a slot 13 above, registering with the slot 4 in the pipe and a groove 14 below in which said slot and groove the slide 1 may operate and find a seat. In this case the slot 13 and groove 14 may be properly machined in order to make a tight fit. But I prefer to make the seat for the slide-gate as I show in Figs. 1 and 2, as in such case I can get the necessary tight fit without machine work, and this construction is for this reason well adapted for sheet metal pipes. Furthermore, as machine finishing is a rather expensive way of making a perfect fit, my preferred construction of seat is of economical advantage.

7 and 8 in Fig. 1 are rings of any suitable yielding or resilient composition enabling them to act as packings. In order to get these rings in contact with the slide 1 along the whole circumference, a conical or sloping recess is provided all along the inside of the circumference of the pipe. In corrugated pipes, one of the corrugations, as shown at 15, acts as such a recess as will be plainly understood from Fig. 1.

9 and 10, Fig. 1, represent metal springs which are formed with a diameter somewhat larger than the diameter of the recess 15 and when inserted in the recess will press against the pipe and tend to slide toward the middle of said recess, thus assisting the packing rings 7 and 8 to press against slide 1. The pressure of the rings against the side will always be sufficient to hold said slide in any position desired without other clamping device. When the slide is pulled out, the packing rings 7 and 8 will slide in toward the middle of the recess and press against each other, thus covering the slot and preventing any leakage through said slot. The edges of the semi-circular portion of the slide 1 are rounded so as to prevent said slide from cutting into or in any way injuring the packing rings, but gently tend to spread said rings as the slide proceeds to its closed position.

Where comparatively light metal is used, it may be required to provide said pipe with one or more reinforcing members and placed in accordance with requirements.

11, in Fig. 1, represents a certain kind of reinforcing member which in this case is a metal band formed to fit the outside of the pipe and fastened by means of rivets.

Having thus described my invention what I claim as new and desire to secure by Letters Patent is—

1. In a slide-gate for pipes, the combination of a circumferentially corrugated pipe having in the apex of one of its ridges a cross-slot and a gate adapted to slide in said slot and to traverse the cross-sectional area of the pipe's interior in the plane of the slot, to close and open the pipe.

2. In a slide-gate for pipes, the combination of a circumferentially corrugated pipe having a cross-slot in the apex of one of its ridges, a gate adapted to slide in said slot to close and open the pipe, and members fitted within the pipe in the slotted valley thereof and bearing on the gate to form a seat therefor.

3. In a slide-gate for pipes, the combination of a circumferentially corrugated pipe having a cross-slot in the apex of one of its ridges, a gate adapted to slide in said slot to close and open the pipe, members within the pipe in the slotted valley thereof and yieldingly bearing on the gate to form a seat therefor.

4. In a slide-gate for pipes, the combination of a circumferentially corrugated pipe having a cross-slot in the apex of one of its ridges, a gate adapted to slide in said slot to close and open the pipe, rings fitted movably within the pipe, in the slotted valley thereof and bearing on the gate to form a seat therefor, and spring members for holding the movable rings to their pressure on the gate.

5. In a slide-gate for pipes, the combination of a pipe having a closs-slot, said pipe having on its inner surfaces an encircling recess the walls of which slope to said cross-slot, a gate adapted to slide in said slot to close and open the pipe, and rings fitted movably within the sloping recess of the pipe and bearing on the gate to form a seat therefor.

6. In a slide-gate for pipes, the combination of a pipe having a cross-slot, said pipe having on its inner surface an encircling recess the walls of which slope to said cross-slot, a gate adapted to slide in said slot to close and open the pipe, rings fitted movably within the sloping recess of the pipe and bearing on the gate to form a seat therefor, and spring members to hold said movable rings to their pressure on the gate.

7. In a slide-gate for pipes, the combination of a pipe having a cross-slot, said pipe having on its inner surface an encircling recess the walls of which slope to said cross-slot, a gate adapted to slide in said slot to close and open the pipe, rings fitted movably within the sloping recess of the pipe and bearing on the gate to form a seat therefor, and springs members to hold said movable rings to their pressure on the gate, said spring members being rings seated under compression in the sloping recess of the pipe and bearing against said movable seat-rings.

8. In a slide-gate for pipes, the combination of a circumferentially corrugated pipe having in the apex of one of its ridges a cross-slot, a gate adapted to slide in said slot to close and open the pipe, rings fitted movably within the pipe in the slotted valley on its inner surface and bearing on the gate to form a seat therefor, and spring rings seated in said valley of the pipe under compression and bearing on the movable seat-rings to hold them to their pressure on the gate.

In testimony whereof I have signed my name to this specification in the presence of two subscribing witnesses.

RAYMOND CHARLES FORCE.

Witnesses:
 A. P. FULCHER,
 J. M. FULCHER.

---

Copies of this patent may be obtained for five cents each, by addressing the "Commissioner of Patents, Washington, D. C."